United States Patent Office 2,908,577
Patented Oct. 13, 1959

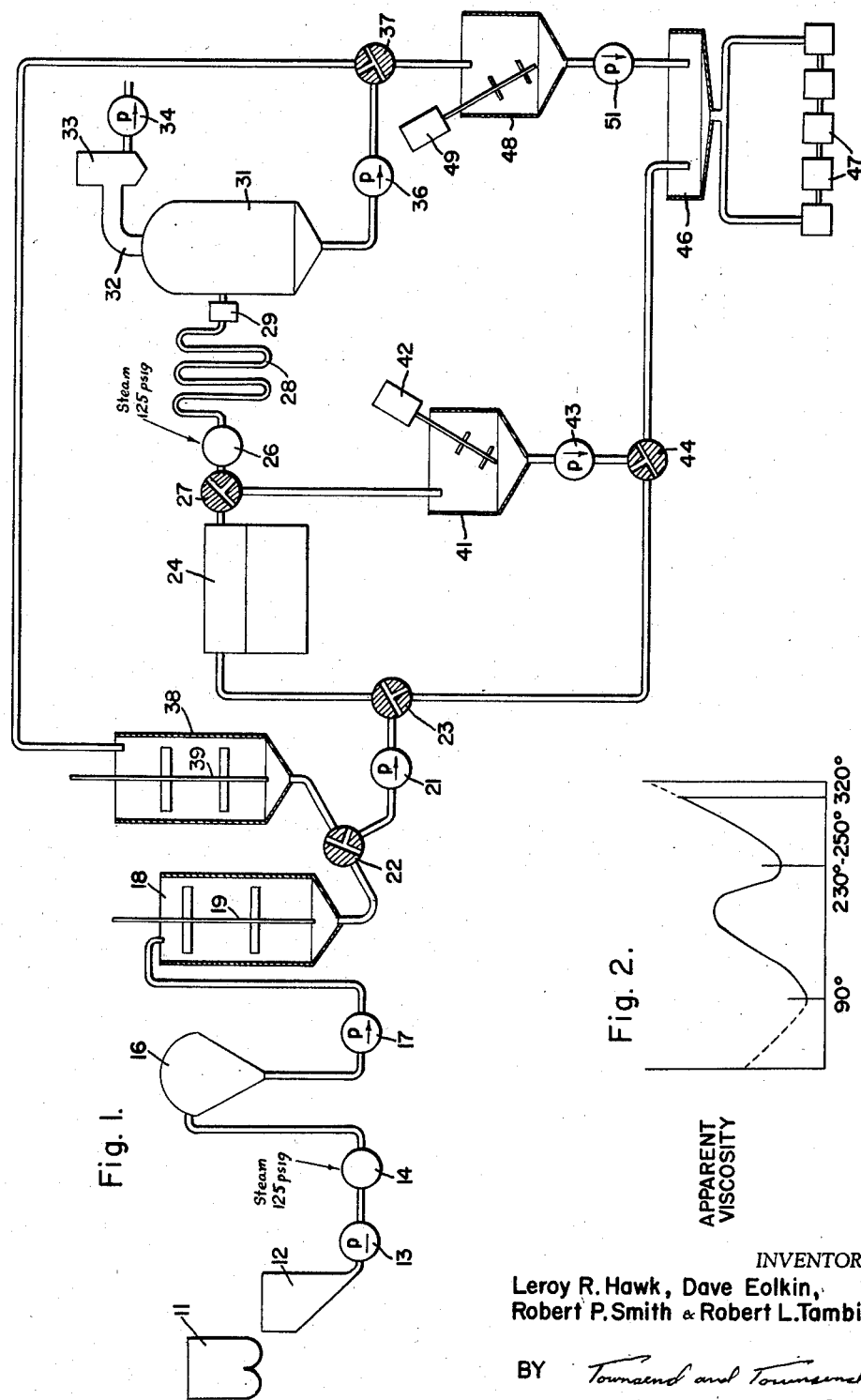

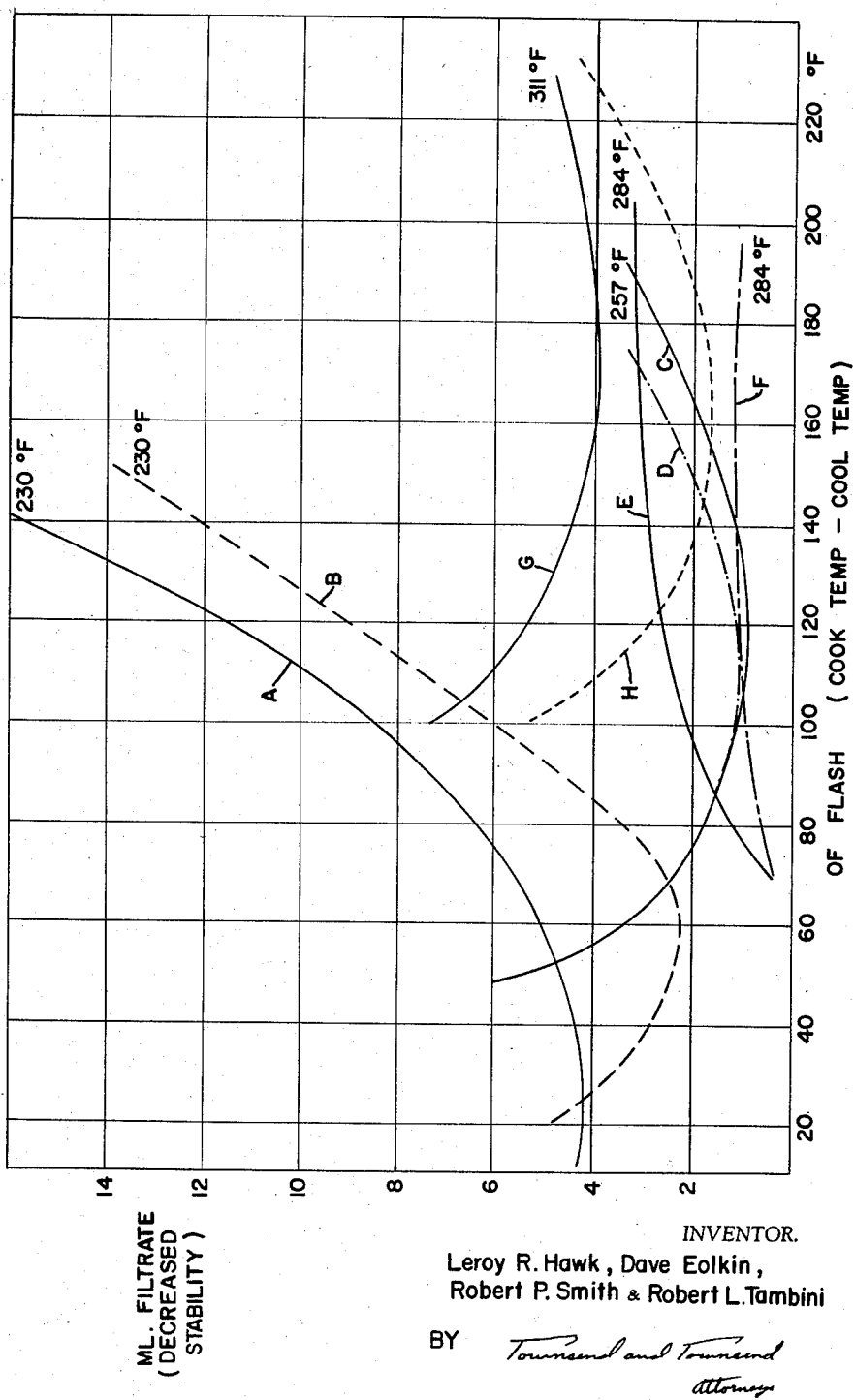

2,908,577

PROCESS FOR TREATING MEATS

Le Roy R. Hawk, Hayward, and Dave Eolkin, Robert P. Smith, and Robert L. Tambini, San Lorenzo, Calif., assignors to Gerber Products Company, Fremont, Mich., a corporation of Michigan Application August 26, 1957, Serial No. 680,107

11 Claims. (Cl. 99—187)

This invention relates to a new and improved process for treating meats. Reference is made to co-pending application of Le Roy R. Hawk, Dave Eolkin and Robert P. Smith, Serial No. 511,644, filed May 27, 1955, for "Process for Treating Meats," now abandoned. Reference is also made to Patent No. 2,753,269 of said Hawk and said Eolkin, with which application Serial No. 511,644 was co-pending.

One of the problems encountered in the preparation of strained meat is the lack of stability of such products in the sense of liquid-solid separation when the product has been subjected to relatively high temperature storage, with or without the agitation associated with transportation and handling. The present invention materially improves such stability and constitutes an improvement in the art.

The present invention comprises presterilization heat treatment of strained meat at higher temperature than has heretofore been employed in order to stabilize the resultant product. The terms "presterilization temperature" and "presterilization heat," as used herein, refer to heat application prior to retorting. Presterilization heat treatment is followed by rapid evaporative cooling. One of the features of the invention resides in the wide spread between the initial temperature of the evaporative cooling and the final temperature of evaporative cooling which has an important effect upon the stability of the product, all as hereinafter more fully appears. After the product has been packed in containers and sterilized, it is found that the liquid does not separate from the solid phase to an undesirable extent despite prolonged storage at temperatures ranging as high as 130° F. and after subjection to agitation encountered by transportation and handling of the product.

Heretofore strained meats of the types which are the subject of this invention have been heat-processed at presterilization temperatures not over 240° F. It has been found in the past that the stability of the product, after retorting and cooling, increases as the presterilization temperature is increased until a peak is reached, whereupon the stability declines or inverts. Heretofore it has been thought undesirable to heat the product at presterilization temperatures higher than that at which the stability of the resultant product begins to fall off. However, in accordance with the principles of the present invention, the product is heated at a high range of presterilization temperatures between approximately 280° F. to 320° F. for veal and 257° F. to 320° F. for beef. Above 320° F. carbonization is likely to occur. It has been found that stability of the product is thereupon considerably higher than when the product is heated in the lower presterilization temperature range which was formerly considered to be the limit beyond which stability decreased. One of the measures of the stability of the product is the apparent viscosity thereof, the apparent viscosity and stability being generally comparable. The apparent viscosity of the resultant product is a measure of the denaturation of the protein content, and accordingly increase in apparent viscosity is a desirable characteristic of strained infant's meats.

The apparent viscosity and denaturation of the resultant product are closely related to the stability thereof. Instability of product is characterized by liquid-solid separation in the slurry and a drop in the apparent viscosity of the slurry.

Another feature of the invention is the fact that the duration of holding the product at the elevated high presterilization temperature range heretofore referred to does not seem to affect the product materially, provided the product is uniformly heated.

A particular feature and advantage of this invention relates to the control of stability of the product by control of what we have denominated the "degree of flash" of the product. By the latter term, we refer to the differential between the initial and final temperatures when the presterilized product is subjected to rapid evaporative cooling. Whereas when products which have been presterilized at conventional temperatures are subjected to evaporative cooling, the stability decreases with the increase in degree of flash, in accordance with the present invention, when the presterilization is conducted at elevated temperatures, the greater the degree of flash, the greater the stability of the product.

Accordingly, the present invention contemplates the presterilization of meat slurry at a high temperature, as hereinafter defined, and then the evaporative cooling of the product with a high degree of flash. The stability of the product is greatly enhanced by this treatment.

Other objects of the present invention will become apparent upon reading the following specification and referring to the accompanying drawings in which similar characters of reference represent corresponding parts in each of the several views.

In the drawings:

Fig. 1 is a schematic flow sheet showing equipment which may be used in carrying out the process;

Fig. 2 is an illustrative graph showing the apparent viscosity inversion of veal above approximately 240° F. and below 320° F.

Fig. 3 is a graph showing the stability of beef for different degrees of products presterilized at different presterilization temperatures.

We have discovered that when strained meat is heated above the normal range of presterilization temperatures, the stability and apparent viscosity drops off sharply, to be followed, after temperature is increased, by an inversion or increase of stability or apparent viscosity to thus produce a better and more stable end product (see Fig. 2). We have found that heating veal slurry in the range of 280° F. to 320° F. is productive of the improved product of this invention. Stated differently, heating the strained veal to a temperature above the last apparent viscosity inversion below 320° F. is resultant in a new and improved strained veal having better stability than heretofore.

The term "apparent viscosity" as used herein means a measure of the thixotropic strained meat product measured in viscosity in centipoise, Brookfield 20 r.p.m. with all samples stirred before analysis. It is recognized that the term is not exact but is the best presently known measure of the character of the product in terms of "viscosity."

The present invention also is concerned with the treatment of other meats, such as, for example, strained beef. The problems of stability of strained beef are not as severe as in the case of strained veal. Nevertheless, the process which is the subject of this invention improves the stability of beef as well as veal.

Referring now to Fig. 1, the equipment which may be used in connection with this invention is subject to certain modifications and variations, as will occur to one skilled in the food processing art. The equipment hereinafter described is illustrative of certain equipment which has been found desirable.

The meat and a suitable proportion of water are deposited in batches in mixer 11 and thence periodically deposited in hopper 12. From hopper 12 the product is fed through a positive action pump 13, such as a Moyno pump, into an agitating heater 14, which may be of the type disclosed in Hawk Patent No. 2,492,635 wherein a substantially instantaneous elevation of temperature is accomplished by direct injection of steam and a thorough mixing of the steam and meat. The purpose of heater 14 is to preheat the meat in order to make it more suitable for milling. The equipment for raising the temperature of the mixture or the temperature to which it is raised is not considered to be critical. In tests conducted under the supervision of applicants, the mixture was heated to around 190° F. and within the range of 190° F. to 205° F. By such preheating, the viscosity is decreased, the mixture is more easily pumped and less power is required for the subsequent milling operation inasmuch as raw meat requires considerably more power for milling than does cooked meat. Further, the gristle, etc. shrinks and becomes tougher and more easily broken by the milling operation after such heating. After preheating, the product is passed through a comminutor mill 16 where it is comminuted through a perforated screen having holes .031 inch in diameter or less. The milled product is then pumped by means of pump 17 into a surge tank 18, where it is stirred by stirrer 19. The elapsed time for heating and grinding was approximately 15 to 20 minutes. A total solids check as run while the product was held in tank 18 at about 205° F., consuming 20 to 30 minutes.

From surge tank 18 the meat slurry may be forced by means of pump 21 through valves 22 and 23 for a first pass through homogenizer 24. It has been found that pump 21 is desirable in that it reduces the problems of feeding homogenizer 24 by its own suction. The pressure of homogenization is not considered critical, inasmuch as the homogenizer 24 is used primarily to maintain a positive flow through the second agitating heater 26. A pressure of 1500 p.s.i.g. in homogenizer 24 has been found satisfactory, but such pressure is not critical so long as it is greater than that exerted by the homogenizer feed pump 21.

The slurry discharged from homogenizer 24 passes through valve 27 into second agitating heater 26 of the same type as heater 14 wherein it is heated under extreme agitation by direct injection of steam to the range of presterilization temperatures desired. Steam at 125 p.s.i.g. is introduced into heaters 14 and 26. A pressure of 100 p.s.i.g. is maintained therein and also in holding coil 28. It is believed that the heating of the finely divided meat particles while under extreme agitation to the optimum temperature range produces the desired texture, consistency and stability of the final product. The agitation prevents the particles from sticking together during heating.

From the agitating heater 26 the product passes through holding coil 28 in which the product is held at the desired temperature. The length of time of holding has not been found to be critical within the range of 10 to 120 seconds. Times of greater than 120 seconds require lengths of holding coils which are not commercially practicable.

A back pressure valve 29 is installed beyond holding coil 28 to maintain the slurry at a pressure greater than the vapor pressure of the product at its existing temperature. From the back pressure valve 29 the product discharges into flash chamber 31 or vacuum cooling chamber operated at pressure ranging from 125 mm. of mercury down to 56.6 mm. of mercury. The pressure is reduced rapidly to reduce the temperature to a range of 100° F. to 220° F. Vapor is continuously removed from chamber 31 through line 32 leading to a tubular condenser 33 evacuated by a pump 34. The degree of flash in chamber 31 is an important feature of the invention, as hereinafter appears.

It is desirable from the standpoint of consumer acceptance that the product be then subjected to a second homogenization step to improve the appearance of the final product, although such homogenization does not materially affect the stability of the product. After retorting, the product which has not been subjected to the second homogenization step appears to the eye to be coarse and hence consumer acceptance of the material is enhanced by the second homogenization. Such step may be carried out with pressure of 3500 p.s.i.g. To accomplish such second homogenization using the same homogenizer 24, cooled product from chamber 31 is pumped by pump 36 through valve 37 to a storage tank 38 stirred by stirrer 39 and thence through valve 22, pump 21 and valve 23 to homogenizer 24 where it passes through valve 27 to tank 41 stirred by stirrer 42. From tank 41 the product is drawn by pump 43 through valve 44 to filler 46 where it is filled into containers 47. It will be appreciated that where two homogenizers are conveniently available, a straight line flow of product may be designed. The containers are then retorted or otherwise sterilized in accordance with conventional cannery practice, as for 75 minutes at 240° F.

Where second homogenization is eliminated, pump 36 draws product from chamber 31 through valve 37 to holding tank 48 stirred by stirrer 49 and whence it is pumped by pump 51 to filler 46.

In order to compare the results obtained by practice of the instant invention with results obtained by other processes, examples are hereinafter set forth showing experiments conducted with strained veal and strained beef.

STRAINED VEAL

Examples 1A and 1B

One thousand pounds of veal were ground through a common meat grinder and 50 pounds of water and 4.25 pounds of salt were added to the batch. The batch was mixed in mixer 11 and then transferred to hopper 12 and pumped by pump 13 to heater 14 where it was heated substantially instantaneously by steam injection to 205° F. The heated slurry was finely ground through comminutor 16 equipped with a perforated screen of a diameter of .033 inch. At this stage the batch weight was 1,173 pounds, indicating the addition of condensed steam during the heating cycle weighing 123 pounds. A total solids test was made and found to be 23.8 percent. Accordingly, 216 pounds water was added at tank 18 to reduce the total solids to approximately 19 percent. After solids adjustment, the temperature in tank 18 was 175° Fahrenheit and this temperature fell during holding time to 164° Fahrenheit after the material had been pumped from tank 18 to homogenizer 24. In Examples 1A and 1B slurry was heated in the heater 26 to 230° Fahrenheit, plus or minus 5° Fahrenheit, held for approximately 10 seconds in coil 28 and then discharged through valve 29 to flash chamber 31 and instantaneously reduced to 210° F. The slurry was then pumped from chamber 31 by means of pump 36 to tank 48 and thence to filler 46. The total solids content was 18.15 percent. The above procedure was subsequently repeated with a variation in the process that more water was added to the initial raw meat batch at mixer 11 and less water added in tank 18. The final product contained 19.6 percent solids.

In order to measure the stability of the product, samples were taken immediately after retort processing, which samples are shown in 1A and then second samples were taken after ten days' storage, which are shown in Example 1B. Testing of the samples was as follows: The samples were placed in a Cenco shaker in a 131° F. incubator and shaken for two hours at a dial setting on the speed control of 6. A second group of samples was held in a 100° F. incubator during the period while the first group was being tested. The second group was subjected to shaking in a 131° F. incubator after the first group had been filtered. After shaking the samples were opened and dumped into a funnel lined with a 24 cm. No. 12 Whatman fluted filter paper. The amount of filtrate was noted at the end of a 15 minute period. As expressed hereinafter, the filtrate is measured in cc. per 3½ oz. container.

The average filtration result obtained was 22.7 cc. immediately after retorting process (Example 1A) and after ten days' storage the average was 21.3 cc. (Example 1B). It will be noted, therefore, that in Examples 1A and 1B, which were processed at a presterilization temperature below the critical range which is the subject of this invention, that the filtrate was high as compared with examples hereinafter set forth.

(In the following examples, the numeral followed by the letter A indicated samples tested after retorting whereas the numeral followed by the letter B indicate samples taken after ten days' storage at 131° F., but otherwise identical with the "A" samples.)

*Examples 2A and 2B*

Two runs were made under the same process conditions of Examples 1A and 1B except that from chamber 31 the material was passed through homogenizer 24 at 3500 pounds pressure. The total solids content of the two batches was 19.21 and 19.33, respectively. The average filtration results immediately after retorting was 17.4 cc. in Example 2A and 13.4 cc. in Example 2B. Homogenization after chamber 31 resulted in slightly less filtrate than in Examples 1A and 1B, showing that after 230° Fahrenheit flash homogenization there is slightly improved stability, but even at best this process does not produce a stable product.

*Examples 3A and 3B*

The next pair of duplicate runs was made exactly as in Examples 1A and 1B except that the product was flashed in chamber 31 to 100° Fahrenheit instead of 210° Fahrenheit. Total solids content of the two finished samples was 19.16 percent and 20.14 percent respectively. The average filtration result immediately after retorting was 11.5 cc. (Example 3A) and 12.7 cc. (Example 3B).

*Examples 4A and 4B*

Duplicate runs were made exactly the some as Examples 3A and 3B except the final product was homogenized at 3500 pounds pressure after flashing. Total solids content was 19.16 percent and 18.65 percent, respectively. Average filtration was 14.8 cc. (Example 4A) and 14.6 cc. (Example 4B). These examples show that high pressure homogenization after flashing increased the filtrate figure slightly, indicating less stability than in the comparison between Examples 1A and 1B and 2A and 2B.

*Examples 5A and 5B*

Duplicate test runs were prepared in the same manner as previous examples except that the veal slurry was heated in heater 26 to 300° F., held 10 seconds and flashed in chamber 31 to 210° F. without further homogenization. Final product contained 19.66 percent and 19.02 percent total solids. Average filtrate was 6.9 cc. immediately after retorting (Example 5A). After ten days the filtrate was 8.4 cc. (Example 5B). These examples show extreme decrease in volume of filtrate obtained, indicating greater stability when the presterilization temperature is raised to 300° F.

*Examples 6A and 6B*

The two previous runs were repeated under the same conditions, but the product was homogenized at 3500 pounds pressure previous to filling. Total solids content was 19.57 percent and 18.74 percent, respectively. Average volume of filtrate immediately after retorting was 10.4 cc. (Example 6A) and the average after ten days was 12.7 cc. (Example 6B). These tests showed that homogenization increased the filtrate, indicating reduced stability.

*Examples 7A and 7B*

Duplicate runs were made by heating in the agitating heater to 300° F., holding 10 seconds and flashing to 100° F. Total solids was 19.28 percent and 19.81 percent. Average filtrate was 4.4 cc. (Example 7A) and 4.4 cc. (Example 7B). The effect of flashing the material to 100° F. compared to 210° F. in Examples 5A and 5B increased stability to a marked degree.

*Examples 8A and 8B*

Runs 7A and 7B were repeated except that the product was homogenized at 3500 pounds pressure before filling. Total solids was 18.86 percent and 19.24 percent. Average volume of filtrate was 3.3 cc. (Example 8A) and 5.5 cc. (Example 8B). There was little change in stability due to homogenizing.

An extended run was made following the procedure given in Examples 8A and 8B consisting of six 1000 pound batches of veal. One alteration in processing conditions was made in that the flash cooling temperature was 135° F., since flashing to 100° F. resulted in such high viscosity as caused difficulty in pumping and filling the product. The average total solids content for the 6000 pounds of product run was 18.93 percent. The average filtrate immediately after retorting was 3.12 cc. and after ten days, 4.2 cc. This run resulted in a very stable product as compared to the conventional process described in Examples 2A and 2B.

STRAINED BEEF

Although strained beef does not show differences in filtrate test comparable to strained veal by reason of the fact that beef is inherently quite stable, nevertheless improvement in stability was obtained by practice of the instant invention. In formulation, to each 1000 pound batch of ground beef, approximately 275 pounds of water was added and 4¼ pounds of salt. The ground beef was precooked through agitating heater 14 to 205° F., then pumped to comminutor 16 and finely ground through a .033 inch screen. The finely ground slurry was then pumped through homogenizer 24 and heater 26, held ten seconds in coil 28 at 100 p.s.i.g. and flashed in chamber 31. All runs were homogenized through homogenizer at 3500 pounds pressure just prior to filling, since the final texture of the product was not desirable without the final homogenizing step.

*Examples 9 to 12*

Four batches were run from heater 26 at which they were heated to 230° F. and flashed in chamber 31 to 210°, 170°, 135° and 100° F., respectively. The total solids content was 18.86, 18.82, 20.41 and 18.92 percent, respectively. The average volume of filtrate obtained immediately after retorting (Examples 9A to 12A) was 4.05, 4.9, 8.45 and 12.95 cc. per 3½ ounce jars, respectively. After ten days' storage the average volume of filtrate (Examples 9B to 12B) was 5.2 cc., 2.2 cc., 5.7 cc. and 10.3 cc. Thus, at a presterilization temperature of 230° F., it appears the greater the degree of flash in chamber 31, the less stable the final product.

*Examples 13 to 16*

Four batches were run with heat treatment at 257° F. and flashed to 210°, 17°, 135° and 100° F. The total solids content was 18.89, 18.75, 18.29 and 18.85 percent, respectively. The average volume of filtrate immediately after retorting (Examples 13A to 16A) was 3.35, 1.45, 0.95 and 1.55 cc. Samples were tested after ten days' storage but no test was run on product flashed to 210°. The average volumes obtained on batches 14B, 15B and 16B at 170° F., 135° F. and 100° F. respectively, were 1.55, 1.08 and 2.3 cc. The volume of filtrate was less than in the series of Examples 9 to 12 and the best result was obtained at 257° F. with a 135° F. flash. In general, heat treatment at 257° F. was superior to 230° F.

*Examples 17 to 20*

This series of batches was heated to 284° F. and flashed to 210°, 170°, 135°, and 100° F., respectively. The total solids content was 19.27, 18.73, 19.13, and 18.96 percent, respectively. Average volume of filtrate immediately after retorting (Examples 17A to 20A) was .75, 2.5, 3.9 and 2.65 cc., respectively. After ten days' storage (Examples 17B to 20B) filtrate volume was 0.58, 0.95, 1.15 and 1.38 cc., respectively. Quantity of filtrate was less than in the series of Examples 9 to 12, but greater than in series 13 to 17. Stability appeared to improve after ten days' storage in this series.

*Examples 21 to 24*

Four runs were made with heat treatment to 311 F. and flashed to 210°, 170°, 135° and 100° F., respectively. However, flashing to 135° F. was eliminated, due to difficulty with equipment. Total solids content of examples at 210, 170° and 100° F. was 18.69, 19.02 and 18.14 percent, respectively, and the volume of filtrate immediately after retorting (Examples 21A, 22A, 24A) was 7.1, 4.4 and 4.45 cc. respectively. After ten days' storage (Examples 21B, 22B, 24B), the average volume of filtrate was 5.35, 1.89 and 3.12 cc., respectively. A slight improvement was noted after ten days, but the series shows slightly less stability than 234° treatment.

The foregoing tests on beef show that 257° heat treatment produces a more stable product, but none of the runs produced what could be interpreted as an extremely unstable product.

*Examples 25, 26 and 27*

A series of three batches was run to determine the effect of solids content of the slurry. All three batches were heated to 311° F. and flashed to 100° F. Total solids content was 17.09, 16.01 and 14.97 percent, respectively, and the average volume of filtrate obtained immediately after retorting (25A, 26A, 27A) was 7.05, 8.3 and 3.7 cc., while after ten days' storage (Examples 25B, 26B, 27B) the average was 6.78, 6.16 and 3.14 cc., respectively. These examples show that even with the total solids content as low as 15 percent, the product was quite stable in the above combination of heating and cooling.

On the accompanying Fig. 3, the results of examples in the treatment of beef are plotted in a graph. The ordinates of the graph show the filtrate expressed in milliliters. Increase in filtrate indicates decrease in stability. The abscissa of the graph show the degree of flash—that is, the difference between the temperature of the product entering and leaving the chamber 31. Line A on the graph shows the results of Examples 9A, 10A, 11A and 12A, whereas line B shows the results of Examples 9B, 10B, 11B and 12B.

It will be seen that except at the extreme left side of the graph, the product when presterilized at 230° F. is less stable after retorting than after storage for ten days. It also appears that increase in the degree of flash materially decreases the stability of the product. Generally, the stability of product when processed at 230° F. is poor as compared with other examples.

Line C on the graph plots the results given in Examples 13A to 16A, whereas line D plots the results given in Examples 13B to 16B. It will be seen that in the range of 257° F. presterilization stability is materially improved over presterilization in the range of 230° F. except at the extreme left side of the graph. Line E plots the result of Examples 17A to 20A, whereas line F shows the result of Examples 17B to 20B. Line G shows the result of Examples 21A to 24A and line H shows the result of Examples 21B to 24B. It is thus seen that in the range 257° F. to 311° F. (curves C to H) considerable improvement in stability results, as compared with the range at 230° F. and it will further be seen that generally in the range 257° F. to 311° F. there is improvement in stability upon increasing the degree of flash, whereas a directly contrary result might be anticipated from the curves A and B. Accordingly, using the greatest degree of flash economically possible for meat products which have been heat treated as above set forth prior to sterilization in accordance with this invention produces the most stable product. Optimum results are obtained when a presterilization heat treatment temperature of about 284° F. is employed, which is materially higher than the temperatures presently used commercially by others.

What is claimed is:

1. A process of preparing a food product which comprises forming a slurry of comminuted meat and water, and heating the slurry to a presterilization temperature above the last apparent viscosity inversion thereof and below carbonization temperature for a time interval of between 10 and 120 seconds.

2. A process according to claim 1 and wherein the product is cooled to the range of 100° F. to 220° F. after presterilization heating, and then retorted.

3. A process according to claim 1 and wherein the presterilizing heating of the slurry is accomplished by direct steam injection while agitating the slurry.

4. A process of preparing a strained meat product comprising forming a slurry of strained meat and water and heating the slurry to a presterilization temperature in the approximate range of 280° F. to 320° F. for a period of between 10 and 120 seconds.

5. A process according to claim 4 wherein, after subjection to the presterilization heat, the slurry is evaporatively cooled to the range of 100° F. to 220° F., and then the product is sealed and then retorted.

6. A process according to claim 5 wherein the presterilizing heating of the slurry is accomplished by direct steam injection while agitating the slurry.

7. A process according to claim 4 and wherein the presterilizing heating of the slurry is accomplished by direct steam injection while agitating the slurry.

8. A process for producing strained meat product which comprises comminuting a slurry of meat and water, subjecting the comminuted slurry to heat and violent agitation in the temperature range of 257° F. to 320° F. and at a pressure of about 100 p.s.i.g. and maintaining the slurry at such temperature and pressure for from 10 to 120 seconds, rapidly reducing the pressure to the range of 125 to 56.6 mm. Hg and a temperature of 100° F. to 135° F., homogenizing the slurry, sealing the homogenized slurry in containers, and completing the cooking of the product in containers.

9. A process for producing strained veal product which comprises mixing veal and water, instantaneously preheating the mixture in the range of 190° F. to 205° F., comminuting the preheated mixture, subjecting the comminuted mixture to heat and violent agitation in the temperature range of 280° F. to 320° F., and a pressure about 100 p.s.i.g. and holding the product at approximately said last-named temperature and pressure for from 10 to 120 seconds, instantaneously reducing the pressure of the product to the range of 125 to 56.6 mm. Hg, filling the product into containers, and completing cooking of the product in containers.

10. A process for producing strained beef product which comprises comminuting a slurry of beef and water, subjecting the comminuted slurry to heat and agitation at about 284° F. to 320° F. and at a pressure of about 100 p.s.i.g., and maintaining the slurry at such temperature and pressure for from 10 to 120 seconds, rapidly reducing the pressure to reduce the temperature to a range of 100° F. to 220° F., homogenizing the slurry, sealing the homogenized slurry in containers and completing the cooking of the product in containers.

11. A stable meat product made in accordance with the process of claim 8.

References Cited in the file of this patent
UNITED STATES PATENTS

| | | |
|---|---|---|
| 1,240,165 | Balzari | Sept. 18, 1917 |
| 1,557,053 | Hooper | Oct. 13, 1925 |
| 2,492,635 | Hawk | Dec. 27, 1949 |
| 2,753,269 | Hawk et al. | July 3, 1956 |